US008782748B2

(12) United States Patent
Olszewski et al.

(10) Patent No.: US 8,782,748 B2
(45) Date of Patent: Jul. 15, 2014

(54) ONLINE SERVICE ACCESS CONTROLS USING SCALE OUT DIRECTORY FEATURES

(75) Inventors: Marcin Olszewski, Redmond, WA (US); Jonathan Luk, Bellevue, WA (US); Alexander I. Hopmann, Seattle, WA (US); Fabricio Chalub Barbosa do Rosario, Redmond, WA (US); David Paul Harris Gorbet, Redmond, WA (US); Jason Matthew Cahill, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 640 days.

(21) Appl. No.: 12/821,103

(22) Filed: Jun. 22, 2010

(65) Prior Publication Data

US 2011/0314520 A1    Dec. 22, 2011

(51) Int. Cl.
    *G06F 7/04*      (2006.01)
    *G06F 15/16*     (2006.01)
    *G06F 17/30*     (2006.01)
    *H04L 29/06*     (2006.01)

(52) U.S. Cl.
    USPC .............................................. 726/4; 713/165

(58) Field of Classification Search
    CPC ............................. H04L 63/104; G06F 9/468
    USPC ............................................. 726/4; 713/165
    See application file for complete search history.

(56) References Cited

U.S. PATENT DOCUMENTS

| | | | |
|---|---|---|---|
| 6,014,686 A | 1/2000 | Elnozahy et al. | 709/202 |
| 6,374,299 B1 * | 4/2002 | Ford et al. | 709/227 |
| 6,378,075 B1 * | 4/2002 | Goldstein et al. | 726/5 |
| 7,237,027 B1 | 6/2007 | Raccah et al. | 709/226 |
| 7,320,074 B2 | 1/2008 | Eggebraaten et al. | 713/182 |
| 7,555,771 B2 | 6/2009 | Bransom et al. | 726/6 |
| 7,921,686 B2 * | 4/2011 | Bagepalli et al. | 70/223 |
| 2003/0105849 A1 * | 6/2003 | Iwamoto et al. | 709/223 |
| 2003/0163730 A1 * | 8/2003 | Roskind et al. | 713/201 |
| 2006/0047725 A1 | 3/2006 | Bramson | |
| 2008/0147745 A1 | 6/2008 | Wilkinson et al. | 707/200 |
| 2008/0163202 A1 | 7/2008 | Kembel et al. | |
| 2009/0077645 A1 | 3/2009 | Kottahachchi | 726/9 |
| 2009/0106411 A1 | 4/2009 | Lisiecki et al. | 709/223 |

(Continued)

FOREIGN PATENT DOCUMENTS

WO    WO 03/038562 A2    5/2003

OTHER PUBLICATIONS

TechNet, Create a New AD LDS Instance, Updated: Aug. 8, 2008.*

(Continued)

*Primary Examiner* — Kambiz Zand
*Assistant Examiner* — Benjamin Kaplan
(74) *Attorney, Agent, or Firm* — Tim Wong; Jim Ross; Micky Minhas

(57) ABSTRACT

Embodiments provide application and/or resource access control features of an online computing environment, but are not so limited. In an embodiment, a computer-implemented method provides access control features for an online application environment based in part on the use of a number of directory service instances isolated from direct customer access and deployed in a defined datacenter architecture. In one embodiment, a computing environment uses web-based access control features and a number of directory service instances having organizational units and corresponding mappings to maintain a support infrastructure as part of providing features of online application services to customers. Other embodiments are included and available.

20 Claims, 6 Drawing Sheets

(56) References Cited

U.S. PATENT DOCUMENTS

| | | | |
|---|---|---|---|
| 2009/0178109 A1* | 7/2009 | Nice et al. ........................ | 726/1 |
| 2009/0313364 A1 | 12/2009 | Parsons et al. | |
| 2010/0199089 A1* | 8/2010 | Vysogorets et al. .......... | 713/168 |
| 2010/0251347 A1* | 9/2010 | Roskind ........................... | 726/5 |
| 2012/0017268 A9* | 1/2012 | Dispensa ......................... | 726/7 |

OTHER PUBLICATIONS

How Grid Computing Works, by Jonathan Strickland, Was available in web archive from May 30, 2008.*

TechNet, Synchronize directory service data, Updated: Jan. 21, 2005.*

How Security Principals Work, Mar. 28, 2003, © Microsoft.*

Oracle® Identity Management, Integration Guide 10g (10.1.4.0.1) B15995-01, Copyright © 1999, 2006, Oracle., Primary Author: Don Gosselin.*

International Search Report and Written Opinion mailed Jan. 2, 2012.

Submitted by Masoud Kalali, "Ludovic Poitou on OpenDS and Directory Server Enterprise Edition," ServerEnterprise Edition, Mar. 31, 2009, http://architects.dzone.com/articles/interview-ludovic-poitou.

Author: Symlabs, Inc., "How Symlabs Virtual Directory Server Ensures 99.999% Uptime for LDAP Directory," (Publicly known at least as early as Apr. 2010), http://symlabs.com/wpaper/1.

"Oracle Directory Services Plus," Oracle Data Sheet, (Publicly known at least as early as Apr. 2010), http://www.oracle.com/technology/products/id_mgmt/odsplus/pdf/ds-oracle-ods-plus-final.pdf.

IBM Tivoli Directory Server, Version 6.0, (Publicly known at least as early as Apr. 2010), http://www.solutionassured.com/Downloads/ds-directory-server6.pdf.

* cited by examiner

ONLINE SERVICE ACCESS CONTROLS USING SCALE OUT DIRECTORY FEATURES

BACKGROUND

One common practice of providing a company-wide collaboration environment requires the purchase of a tangible software product for local installation and deployment within a user or company network. For example, a company can deploy a company-wide network architecture to control file and resource access by users, relying in part on company firewall resources and a local directory application to maintain access permissions for the architecture. The directory can be used to contain a centralized list of users for the system. For example, a directory can be used to create a private workspace (My Site) for each user in the directory. As the number of users and network components increase, the task of maintaining security and access permissions can be time consuming and costly to the bottom line of a business that relies on the installed product.

As a natural evolution from the old paradigm, online application services are used more and more as businesses gravitate away from the often inefficient and tedious installation and management of applications and/or users within a defined network. Leaving the heavy lifting of maintenance, updates, and security to a separate entity is an attractive option. Ultimately, there has to be some mechanism in place to ensure that access to customer data is limited to authorized users. For example, hosted application services need to consider quality of service, site density, security, and/or other service issues. Complexities associated with controlling access to hosted application services by current and future customers compound with scale and become more difficult to maintain.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments provide application and/or resource access control features of an online computing environment, but are not so limited. In an embodiment, a computer-implemented method provides access control features for an online application environment based in part on the use of a number of directory service instances isolated from direct customer access and deployed in a defined datacenter architecture. In one embodiment, a computing environment uses web-based access control features and a number of directory service instances having organizational units and corresponding mappings to maintain a support infrastructure as part of providing features of online application services to customers. Other embodiments are included and available.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Figure 1:
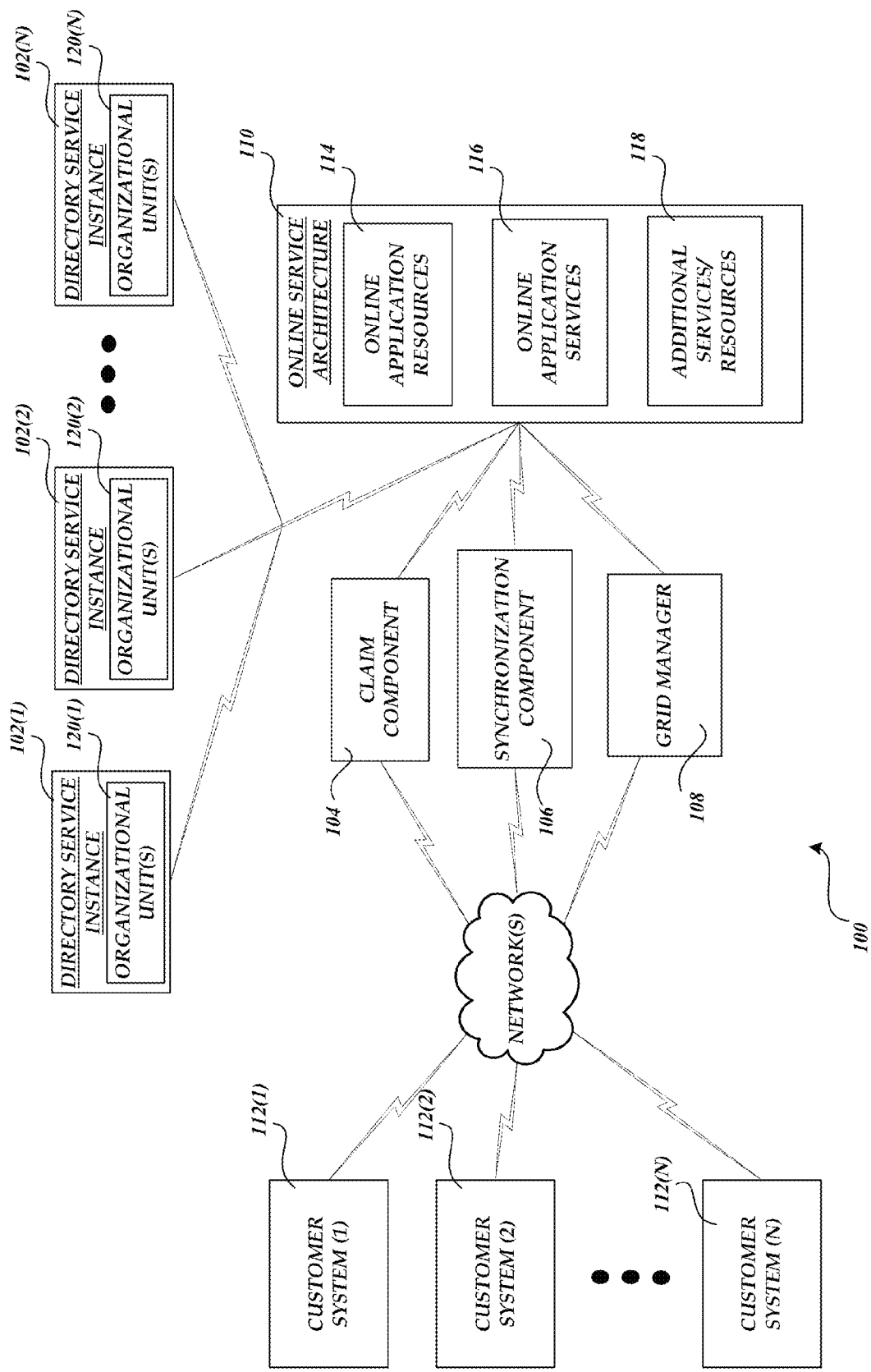
FIG. 1 is a block diagram of an exemplary computing environment.

FIG. 1 is a block diagram of an exemplary computing environment 100 that includes functionality to provide online application services and/or resources to permitted users of the environment 100. In an embodiment, the environment 100 includes the use of a number of directory service instances 102(1)-102(n) to manage and control aspects of online application services and/or resources delivered to subscribing customers and other authorized users, but is not so limited. As discussed below, subscribing customers can access and use online application services and/or resources of the environment 100, including online service networks based in part on a number of directory service instance parameters. Exemplary online service networks can include public and private networks communicating over some communication channel, such as web-based networks (e.g., the Internet). Customers can subscribe to use certain online services and/or resources which may encompass multiple hosts, partners, and site collections for example.

As shown in FIG. 1 and described in detail further below, the environment 100 includes a claim provider component or claim provider 104, a synchronizer component or synchronizer 106, a grid manager component or grid manager 108 associated with an online service architecture 110 that provides services and/or resources to a number of entities that include customer systems 112(1)-112(n). In one embodiment, the claim provider 104, synchronizer 106, and grid manager 108 are included as part of a centralized resource center, available to components of a defined grid network. The online service architecture 110 of an embodiment includes online application resources 114, online application services 116, and other resources/applications 118 including processing, networking, and/or memory resources. It will be appreciated that the environment 100 can include additional components and configurations. For example, each grid network can include different server and/or component topologies configured to service different types of customers.

In various embodiments, all or select portions of the architecture 110 can be accessed and used by customers and/or other users of the environment 100 based in part on distinct customer and other information contained in the directory service instances 102(1)-102(n). As described below, the directory service instances 102(1)-102(n) can be used by components of the environment 100 as part of maintaining and providing online services and/or resources to each customer, including any permitted employees, partners, and/or other subscribers or users. For example, each directory service instance can be used to control access to services and/or resources based in part on user identity, security permissions, support roles, and/or associated groups of each subscribing customer.

The environment 100 of an embodiment includes the use of a number of domain controllers to control access to and manage directory service instances as part of providing the online services and/or resources. Domain controllers, dispersed throughout the environment 100, can be used to provide a robust, fail-over online service and resource architecture. In one embodiment, the environment 100 uses multiple domain controllers deployed with each directory service instance as part of servicing various customers and/or regions, but is not so limited. For example, multiple domain controllers can be deployed in remote datacenters (e.g., physical hosting locations) as part of facilitating synchronization and other services with customer accounts using one or more of the directory service instances 102(1)-102(n). Additional domain controllers can be deployed for each directory service instance as part of improving performance of authorization queries and/or other operations.

According to an embodiment, the claim provider 104, synchronizer 106, and grid manager 108 can include functionality to provide user authorization and access, resource management, partner and/or other access and usage features using one or more directory service instance (DSI) data structures to provide online services to subscribing customers. In one embodiment, the claim provider 104 is included as part of a web server role and operates to query a domain controller associated with a DSI data structure as part of controlling access to services of a grid network. The environment 100 of an embodiment includes a plurality of domain controllers (e.g., two, four, six, etc.) associated with each DSI data structure. In one embodiment, the number of domain controllers and DSI data structures can be streamlined based in part on examination of a number of performance metrics that track performance features of an online service. For example, a performance metric can track operation of a particular query based in part on a function of the number of objects contained in a DSI data structure. The performance metrics can be used as part of deploying additional DSI data structures and/or other components.

The synchronizer 106 of an embodiment can be used in part to populate and maintain each DSI data structure with customer information of many different customers. Such population operations of one embodiment depend in part on the allocated number of objects to contain with each DSI data structure. In one embodiment, the synchronizer 106 can use a schema and number of web service calls to populate and manage each DSI data structure. The synchronizer 106 of one embodiment uses a synchronization daemon, described below, to examine data objects (e.g., new, update, deleted, etc.) for a given customer, but is not so limited. For example the synchronization daemon can issue a query to an available web service component to locate a particular DSI data structure whenever a customer change is detected or realized (e.g., company information has changed, list of users has changed, groups have changed, subscription and license changes, etc.). The queried web service can operate to provide a name of an associated DSI data structure to the synchronization daemon and used by the synchronizer 106 as part of a synchronization operation. In one embodiment, a unique GUID can be used by the synchronizer 106 as an identifier for each customer and contained in an associated DSI data structure to identify an associated organizational unit data structure.

The synchronizer 106 can use a plurality of organizational units 120(1)-120(n) of various DSI data structures to maintain integrity of the online services, such as keeping online service accounts up to date for example, wherein each organizational unit can be populated with information of a distinct online service customer, partner, affiliate, and/or other user. For example, each organizational unit can be used to represent customer subscription details for a given customer, including permitted customer users, access and/or security groups by service and/or resource, extranet users, and/or foreign principle objects (FPOs).

In an embodiment, a FPO can be used to represent a non-employee user or permission group of some customer. In one embodiment, one or more FPOs can be contained in an organizational unit of a first company, wherein FPO mapping parameters point to another user object, group, and/or directory service instance of one or more different organizational units that may or may not be included in the same grid network. For example, a FPO can be instantiated in the organizational unit of the first company as a virtual representation of an administrator agent group contained within a second customer's organizational unit data structure. Correspondingly, permissions can be defined for non-employee and non-extranet users of a customer organizational unit in a similar fashion as giving permissions to groups of the customer organizational unit. For example, users associated with a group FPO obtain access to an owner's site collection since the FPO objects are included as members of an authorized security group that has access to the site collection (e.g., administrator group, special access group, etc.)

With continuing reference to FIG. 1, the grid manager 108 of an embodiment operates as a central control center or governing component of a grid network of the environment 100. The grid manager 108 of one embodiment acts as a web service host of an associated grid network or networks. For example, the grid manager 108 hosts a number of web services that function to locate servers, create new customer objects, locate directory service instances, and/or provide other services or functions. The grid manager 108 can preserve locations and/or mappings to particular DSI data structures for subscribing customers owning some site collection or collection of site collections.

DSI data structures of one embodiment can be added by the grid manager 108 to the environment 100 for various reasons. In some cases, a customer request for additional services based on the addition of new employees or groups may require addition of a new DSI data structure to act as a container for the customer request since an existing DSI data structure does not have the capacity to contain a given amount of customer information. The grid manager 108 may also manage aspects of the grid network once some container threshold, query lag, or other issue adversely affects performance. The grid manager 108 of one embodiment explicitly tracks (e.g., using mappings) locations of each DSI data structure, including new and relocated DSI data structures.

The claim provider 104 can use information provided by the grid manager 108 to query a corresponding DSI data structure for each new request. For example, as part of responding to a request, the claim provider 104 can use metadata associated with a site collection to identify a name of the DSI data structure for an owner of the requested collection to query based in part on an identified name. In one embodiment, each DSI data structure can be used to include customer information of multiple subscribing customers, including competitor companies, partners, trusted and/or non-trusted affiliates, which can be used to provide certain online services and/or resources for a given user. In one embodiment, DSI data structures are populated with support groups that identify support partners (e.g., FPO(s)) that can be called on to solve any service issues.

As one example of providing an online service feature, a DSI data structure can be used by the claim provider 104 to determine whether some requesting user is a member of a customer who subscribes to a particular application service or resource. The claim provider 104 can base access or denial of access in part by determining if the request was issued by a permitted member of the customer using a corresponding DSI data structure. For example, a DSI data structure can be referred to and used by the claim provider 104 to deny access to users who may have been recently demoted or terminated from a respective company or partner company. In such an example scenario, the DSI data structure can be used to disconnect or disassociate internal company access control lists linked to customer resources that may still contain "allow" permissions for the disconnected or recently unauthorized user. Accordingly, DSI data structures enable explicit control over which users can or cannot access resources of an online service site collection, independently of whether the underlying customer system has "allow" permissions for the user.

In an embodiment, components of the environment 100 can also use one or more DSI data structures as part of providing a resource management model for an online datacenter. The DSI data structure of one embodiment can be used as part of communicating and/or storing data using online storage resources allocated to each respective subscribing customer. Customers may elect to instantiate additional assets throughout the lifetime of any particular access and use subscription for an online service or resource. In one embodiment, any maximum quantity of assets that can be created and/or used by a customer is based in part on specific subscription and/or use types.

The claim provider 104 of one embodiment can use a DSI data structure to determine if a customer has any remaining storage of a total storage allowed when using the grid manager component 108 to add new customer assets to an existing DSI data structure. For example, based in part on a subscription type, when the customer attempts to create new assets, the DSI data structure can be checked by the claim provider 104 to determine an amount of remaining capacity and the current usage before allowing or preventing the creation of additional assets by subscribing customers.

Components of the environment 100 can also be used to enable customers to build a business model around "supporting" other customers. For example, a first customer can be given administrative permissions to assets (e.g., online site collections for providing certain services and/or resources) owned by a different customer having no defined relationship outside a partnership defined by parameters of a DSI data structure. In one embodiment, a first organizational unit 120 (1) associated with a first customer can include pointers or mappings to users and groups of users of a second organizational unit 120(n) associated with a second customer. Correspondingly, a DSI data structure can be used to determine if a particular user of one customer is an authorized user or supporter of another customer or customer partner.

In one exemplary environment 100, components can be configured to operate to provide online services and/or resources to customers, support partners, and/or other trusted users using one or more DSI data structures to control access to various online resources, including using computing resources distributed throughout a grid network. Customer permission data and other information can be used to populate organizational units with information corresponding to customers of one or more DSI data structures. Each organizational unit of an embodiment can be populated with user lists, group lists, distribution lists, extranet users, FPOs, subscriptions, and/or other customer information.

In one embodiment, organizational unit and/or directory service instance mappings can be used to discover and locate permissions associated with user access requests as part of implementing access control features to subscribing users of the environment 100. Original, new, and/or modified customer information can be communicated and used to populate each organizational unit of one or more DSI data structures as part of controlling access to resources and/or services to thereby maintain access control with the addition or departure of employees, partners, and/or other authorized or unauthorized associates. For example, an organizational unit of a DSI data structure for a large enterprise can be populated with permitted users and types of access. For such an example, permissions can be based in part on a subscription type and/or security type or group using a dedicated grid network of server farms as part of providing virtual application resources to enterprise employees, support providers, and/other defined users.

Components of the environment 100 can use DSI data structures as part of providing secure access to geographically dispersed data centers, including handling service outages, resource allotments, and/or select customers; use of required compliance policies and antivirus signatures, along with high-level configuration settings and required security updates; asset allocation and availability based on a subscription and/or service level agreement; web site availability for administers and other allowed users to manage select online services; and synchronization of a customer on-premises (e.g., local) directory service application with an online services directory using the synchronizer 106 and a defined level of trust.

The synchronizer 106 of one embodiment operates to synchronize information of one or more of the customer systems 112(1)-112(n) with an online services directory component as part of populating DSI data structures with customer data and access privileges. In one embodiment, each DSI data structure can be populated with customer information including authorized users, access levels, subscription parameters, service agreement access limitations, etc. The DSI data structures can be physically and/or logically isolated or communicatively decoupled from one another and the customer systems as part of independently controlling access to online services and/or resources. While a certain number and types of components are described above, it will be appreciated that other numbers and/or types can be included according to various embodiments. Accordingly, component functionality can be further divided and/or combined with other component functionalities according to desired implementations.

Figure 2:
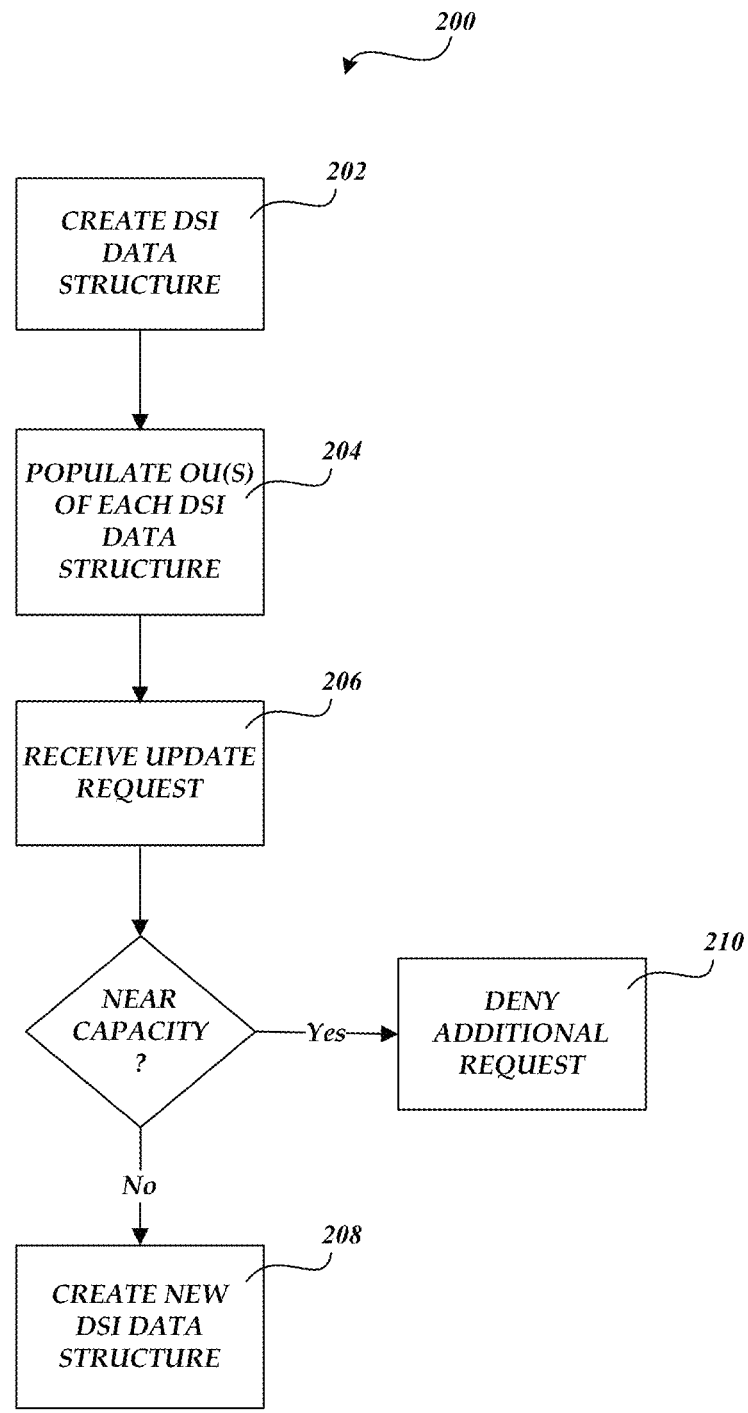
FIG. 2 is a flow diagram illustrating aspects of an exemplary online application service.

FIG. 2 is a flow diagram illustrating an exemplary process 200 that can be used to provide online application services and/or resources, including access control and subscription maintenance services, but is not so limited. While a certain number and order of operations is described for the exemplary flow of FIG. 2, it will be appreciated that other numbers and/or orders can be used according to desired implementations. At 202, the process 200 of an embodiment can be used to deploy serving and networking architectures as part of providing an online datacenter by creating one or more DSI data structures that include organizational unit and other data structures used in part to delineate different subscribing customers. In one embodiment, the process 200 at 202 includes the deployment and/or use of server farms and other components that support online application services and resources during the creation of each DSI data structure.

The process 200 of one embodiment employs the use of a deployment script that includes application code to automatically create new DSI data structures including ensuring that servers are configured properly, permissions are set, and the DSI data structures are ready for use. For example, process 200 can be used to deploy separate grid networks located in separate continents that employ the use of distinct directory service instances corresponding to online site collections that are used in part to provide online services and/or resources to corresponding subscribers, such as large, medium, and small businesses, along with individual users, as examples. In some embodiments, components of a site collection (e.g., server farm) can be shared or distributedly used by servicing and other components of a grid network.

In one embodiment, the process 200 includes a subscribing phase where customers subscribe to some desirable online feature or features, including defining select support and other partners that can be called upon as part of maintaining delivery of services and/or resources to requesting users. A subscribing customer can define information such as access privileges for each employee, security group(s), support entities, partner(s), FPOs, distribution lists, and other permitted users for population in respective organizational unit data structures during and after the subscription phase. In an embodiment, a FPO can be configured as a special type of tenant object that maps to another tenant which provides support services for other customers. Different levels of permission can be controlled for each user or group based in part on the topology of an associated DSI data structure.

As an example, once created, DSI data structures can be used to control access to a server farm of a grid network configured as a set of virtual machines that form a logical farm of servers, including various server roles (e.g., web front end, back end, content, communication, application, etc.) as part of providing online services and/or resources to different customers having different subscription types. It will be appreciated that each grid network can include multiple server farms depending in part on the scale of the online service network and associated customers. Customers can create customized online service topologies, including creating extranet site collections and designating associated users from different namespaces as extranet users.

At 204, each organizational unit of a corresponding DSI data structure is populated with information that corresponds with each subscriber's subscription definitions. For example, each organizational unit can be populated with customer identification information, employee data, groups, and/or FPOs. In one embodiment, the definitions can be based in part on a subscription type, a level of service or license agreement, and a current allocation threshold associated with each customer. During an exemplary synchronization operation, the process 200 can operate to pull customer data (e.g., user names, email addresses, contact information, groups, subscription(s) information, license information, etc.) from a partner system, pushing the extracted data to computing systems associated with each DSI data structure (e.g., dedicated serving platforms). Extranet users can also be populated as part of a DSI data structure according to user preferences and/or definitions.

At 206, the process 200 receives an update or modification request that may affect accessibility of subscriber services and/or resource. For example, a synchronization daemon can be used to populate directory service instances with original, new, modified, and/or other customer information if the customer allotment has not reached some defined threshold based in part on a subscription or license type. It will be appreciated that updates to any particular grid network can include the sometimes continual changes made to each customer's business model and/or infrastructure, potentially affecting an associated directory service instance. For example, company changes can affect employee, partner, and extranet access privileges, such as new employee privileges, revoking partner privileges, terminating a license agreement, etc.

At 208, the process 200 of one embodiment can operate to create one or more new DSI data structures if a DSI data structure associated with the request is nearing some capacity or other threshold. For example, technological scale limitations and other factors may limit the number of objects that can be effectively contained by each data source instance. In one embodiment, the number of objects available to a customer can be based in part on an appropriate extension subscription or license. If the customer does not have the appropriate extension subscription or license, at 210 the process 200 can operate to deny the request. In one embodiment, the denial of service can include a request to upgrade to a different subscription type or license.

As an illustrative example, the process 200 can be used to synchronize information of a new customer or tenant subscribing to select online application and/or support services. For example, a new customer can be added to a customer pool contained in a service instance based in part on a service location and/or type of a subscription agreement that identifies levels of service and access as defined and/or customized by each customer. Depending in part on a service instance state of a targeted service instance (e.g., stalled state, nearing capacity, ¾ full, ½ full, etc.), the process 200 can create a new tenant in an existing service instance or create a new service instance for containing additional tenant objects. In one embodiment, a synchronization daemon for the service instance collects the new tenant information and queries a grid manager to assign a directory service instance or instance collection to a tenant, including storing mapping parameters for future reference and use. The synchronization daemon can use a grid manager response to create the tenant and write the tenant objects to the associated directory service instance.

As another illustrative example, the process 200 can be used to synchronize updates for an existing tenant consuming resources of an online service. For example, a tenant company having access to an online site collection may hire new employees having different trust levels, fire employees, or acquire other companies. For this example, as part of an update operation, a synchronization daemon fetches all updates for tenants for a particular service instance (e.g., Virginia datacenter as compared to a London datacenter). For each tenant, the synchronization daemon queries the grid manager to identify the directory service instance or collection where the tenant information is maintained. In one embodiment, the grid manager maintains global mappings between tenants and directory service instances. The synchronization daemon can use the global mapping information provided by the grid manager to synchronization any updates to the correct directory service instance.

As yet another illustrative example, the process 200 can be used as part of discovering a directory service instance topology during synchronization daemon initialization. For example, the synchronization daemon can, during initialization for example, discover a list of directory service instances that exist in a given grid network, identifying names of domain controllers dedicated to synchronization operations for the respective directory service instances. In one embodiment, the synchronization daemon can elect a first domain controller as a "write-to" domain controller and a second domain control as a "read-from" domain controller. Other embodiments are available.

Figure 3:
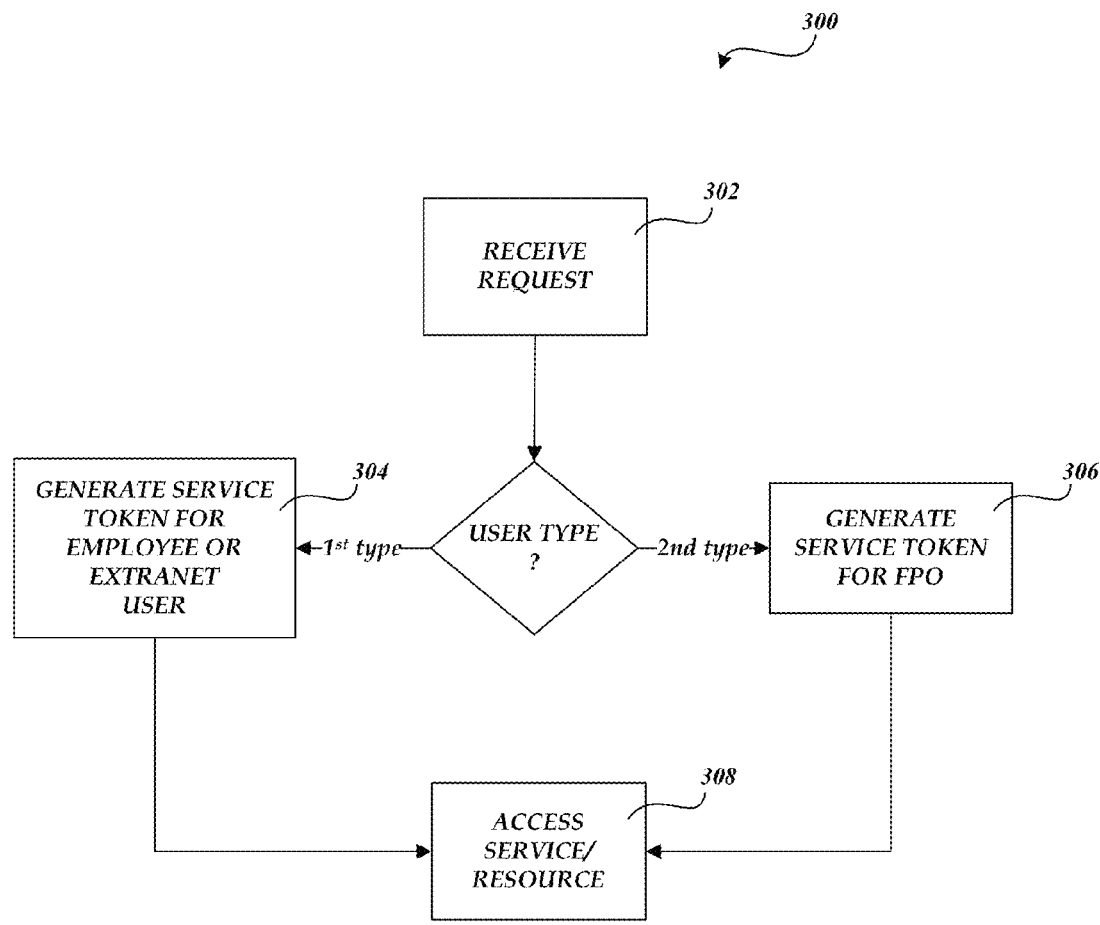
FIG. 3 is a flow diagram illustrating an exemplary process of controlling access to online application services and/or resources.

FIG. 3 is a flow diagram illustrating an exemplary process 300 of controlling access to online application services and/or resources. For example, the process 300 can use a number of directory service instances as part of controlling access to online site collections. While a certain number and order of operations is described for the exemplary flow of FIG. 3, it will be appreciated that other numbers and/or orders can be used according to desired implementations. At 302, an access request is received requesting access to an online service and/or resource. For example, a user may be using a smart phone in attempts to access an online company resource managed by a third party as part of an online application service.

In one embodiment, one or more web front end components process an incoming request as part of controlling access to subscribed to online services and/or resources. The process 300 of one embodiment can operate to determine a type of authorized user (e.g., employee, extranet user, FPO user, etc.) before allowing access. For example, an online service authenticator (e.g., LiveID service) can generate a service token that includes a user identifier (e.g., extracted domain from user email address) upon a successful authentication to an online site collection owned by a user employer or partner. Service token parameters can be used in part to identify a directory service instance and/or an organizational unit associated with the requesting user.

At 304, a service collection token can be generated for an employee user or extranet user using information of a received access request. In one embodiment, a claim provider component included as part of a web front end topology can operate to build a service collection token using all or some portion of a requesting user email address (e.g., user@companyA), augmented with any group claims. In one embodiment, a claim provider component locates the associated user object using the user's identifier (e.g., PUID, GUID, etc.) within a directory service instance containing the employer organizational unit information. Once located, the claim provider component can operate to augment the associated service collection token with claims for security groups from a located organizational unit, including maintaining a mapping to the organizational unit for the particular user.

In one embodiment, as part of processing an access request, a web front end component can identify a subscription ID for a given site collection, and resolve the subscription ID into the organizational unit distinguished name (OUDN) of the organizational unit of the tenant that owns the site collection. As an example, a user can navigate to a site collection with a valid live token containing a user principal name (UPN) and unique user ID (e.g., passport unique ID (PUID)) and the web front end component can pass the PUID, UPN and/or OUDN to the claim provider component for further processing in responding to the access request.

At 306, the claim provider component of an embodiment can operate to generate a service token for a foreign user, such as a non-employee partner for example, based in part on a received access request. For example, the claim provider can operate to build service tokens for authorized partner users (e.g., OU(1)-OU(5)) to access a site collection owned by some online service subscriber (e.g., OU(N)). In one embodiment, as part of the token generation, the claim provider component operates to request a directory connection to a directory service instance that contains a particular organizational unit in order to augment a service token for a foreign user access request (e.g., using foreign PUID) with any group claims.

The claim provider component of an embodiment can send a query (e.g., light directory access protocol (LDAP) query) to search a particular organizational unit for the user object for the PUID as part of reading an attribute (e.g., token-Groups) from the user object. In one embodiment, the attribute can be configured to contain a list of security identifiers (SIDs) of all groups the user belongs to, including all levels of nested groups. The claim provider component can add a group claim to the service token for each SID. In one embodiment, the claim provider component includes a base access claim with the service token required for accessing any authenticated resource of a site collection or collections, augmenting the service token with group claims matching the partner role.

In one embodiment, the process 300 can determine a partner agent type or partner agent authorized to access resources of some subscribing customer. A partner agent of one embodiment requires a customer having a contract with an associated partner. For example, a contract object can be used to contain references to contexts of both organizations that entered the contract and a list of partner agent roles permitted to act under the contract. When the contract object is created, one or more FPOs can be used to populate a customer organizational unit.

Each FPO within customer organizational unit of one embodiment contains a reference to the partner tenant and to a support agent role that agents can assume when working on-behalf-of a customer (e.g., Administrator or Help Desk). For example, support agent roles determine whether an agent can act as Administrator or Help Desk for any customer. In one embodiment, a FPO object can include a contract object containing references to partner organizations that an allowed partner agent role needs to match before gaining access to a customer's site collection. For this example, the partner agent role assigned to the agent in a partner context should match an agent role in the FPO contained in the customer organizational unit including having a matching contract object in the partner context.

As another example, assume that a support user authenticates properly, as part of attempting to access an application site collection belonging to Company A. A web front end component receives a request from the support user's computing device or system that contains a PUID and UPN (e.g., user@support.com) for the user as part of the service ID (e.g., LiveID). The claim provider component can locate the Directory Service Instance and the Organizational Unit that contains the support user record by calling the grid manager to resolve the domain part of the user UPN (e.g. support.com) into the Directory Service Instance name and OU Distinguished Name (OUDN). The claim provider component can then locate a support user object based on its PUID by searching the identified OU inside the identified directory service instance. The claim provider component can build a service token for the support user augmented with any group claims. As described above, a FPO for the support user can be instantiated in Company A OU and mapped to an OU belonging to the support entity or tenant. The claim provider component can validate that the support user holds a partner agent role that corresponds to some support contract, augmenting the service token with claims for security groups from Company A OU that the partner agent role is assigned in Company A. At 308, a permitted user can access an online service and/or resource. Other embodiments are available.

Figure 4:
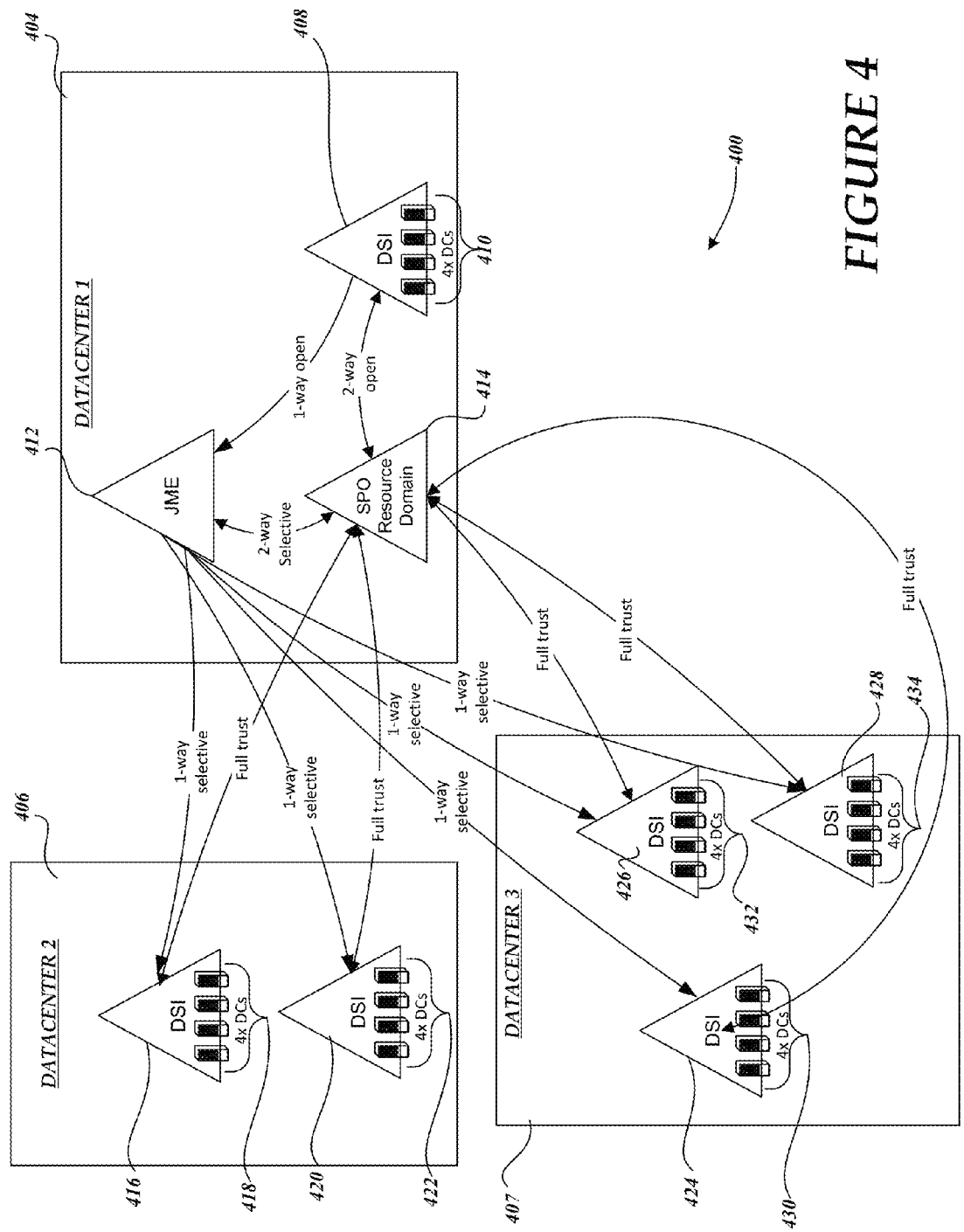
FIG. 4 is a block diagram of an exemplary grid network environment.

FIG. 4 is a block diagram of an exemplary grid network environment 400. For example, the grid network environment 400 can be configured to provide application and other services to communicating clients using a number of server farm architectures. Server farms can include any number of physical and virtual components having various relationships, interrelationships, and disassociations required to meet solution goals. In one embodiment, resources/services of one or more server farms can be accessed using a computing network, such as the Internet for example, as part of providing online services to customers. In one embodiment, the grid network environment 400 includes a number of directory service instances that include information of multiple customers as part of providing online services over the Internet or some other communication path or network for example.

It will be appreciated that the environment 400 can include other components including additional grid networks and associated directory service instances. In one embodiment, the grid network environment 400 can be used as part of providing online datacenters having a plurality of grid networks. Grid networks can be configured to serve some defined customer population. For example, distinct grid networks can be configured and deployed to service north American, Asian, and European geographical regions, including using directory service instances to manage access controls for customers and other authorized users of each region. Grid networks can be configured as a group of processing, memory, and application resources including communication couplings having fast network connections and low latencies for example.

As shown, the exemplary grid network environment 400 of FIG. 4 includes a first datacenter 404, a second datacenter 406, and a third datacenter 407. For this example, datacenter 404 includes an directory service instance (DSI) 408 including four domain controllers (represented collectively as 410) communicatively coupled to a joint management environment 412, and a resource domain 414 serving the grid network 400. In one embodiment, a global instance can be used to represent the joint management environment 412 including a single domain directory forest. As an example, a joint management environment domain can be configured to encompass all physical machines (e.g., virtual machine hosts), virtual machines, and service accounts used by service farms.

Exemplary online service networks can include a number of grid networks depending in part on deployment considerations including physical, logical, and other topology constraints. An exemplary grid network can be configured as a set of grid servers and network devices having low-latency and high throughput network connectivity used in part to provide application and other online services to subscribing and licensed customers for example. Each grid network of one embodiment contains a replica of the joint management environment directory 412 (e.g., ACTIVE DIRECTORY application), a number of server/application farms, and/or a number of customer objects representing subscribing customers and/or permitted users including partners and extranet users. For example, each grid network can be deployed to encompass groups of server computers providing online application services, and customer forests distributed among certain server computers, wherein customer forests can include subscription, partner licensing, and other information associated with each customer subscribing to at least one of the online services.

Datacenter 406 includes directory service instance 416 including associated domain controllers 418, and directory service instance 420 including associated domain controllers 422. Datacenter 407 includes directory service instances 424, 426, and 428 including respective domain controllers 430, 432, and 434. As shown, DSIs of datacenters 406 and 407 are also communicatively coupled to the joint management environment 412 and resource domain 414 serving the grid network 400. FIG. 4 depicts a number of exemplary trust relationships between components of the grid network environment 400. In one embodiment, directory service instances are independent of one another and not linked with trust relationships.

In an embodiment, the resource domain 414 is communicatively coupled with each directory service instance (e.g., defined at deployment) and includes a grid manager, synchronization daemons, and/or provider daemons operatively used in conjunction with respective domain controllers of each directory service instance. In one embodiment, a resource domain 414 includes all machines (physical and virtual), roles, and/or accounts of a grid network, excluding the directory service domain controllers. Each component of the resource domain 414 can be deployed out of band before deploying directory service instances. The out of band deployment of one embodiment includes setting up the actual instance and trust relationships with the joint management environment component 412, creating service domain accounts that will access deployed directory service instances, and deployment of a manager gateway.

In an embodiment, a grid manager operates in part to coordinate a directory service instance deployment procedure by setting up virtual machines for new domain controllers and initiating a deployment script of an online directory service server role. In one embodiment, new virtual machines can be installed using a default grid topology that includes a number of processing resources (e.g., 2, 4, etc. CPU cores) and some amount of processing memory (e.g., seven gigabytes (GB) of random access memory (RAM)) for each virtual machine. Each virtual machine can be promoted to a domain controller for a new forest. In an embodiment, virtual machines can be deployed using separate hosts to avoid multiple domain controller failures due to same root cause event. The grid manager of one embodiment operates to monitor deployment status of directory service instances and makes a new directory service instance available to callers of an application programming interface (API) (e.g., GetDSITopology( )) when the directory service instance is ready for population and use.

In an embodiment, a single instance of a synchronization daemon can be shared by all directory service forests in a grid network. The synchronization daemon can use domain controller names or other identifiers to identify dedicated domain controllers for each grid network. The synchronization daemon can use domain mappings in part to identify organizational units of each directory service instance. A synchronization daemon of one embodiment can function to populate directory service forests with objects pulled from a synchronization communication stream associated with a customer system. In an embodiment, the environment 400 can employ a single synchronization communication stream for each grid network. In another embodiment, a synchronization communication stream can be used for each directory service forest.

The claim provider of one embodiment can operate to augment a support agent user's token with identifiers of FPOs as well as any groups that FPOs belong to the site owner's organizational unit. As an example, the claim provider can use a provider daemon that operates to create a service token for an incoming user based in part on an authenticated identification (e.g., LiveID) token and contents of a directory service instance. Content of a directory service instance can be searched to fetch a list of users and/or groups available in an organizational unit for various administrative tasks. As an illustrative example, in order for a "partner user" to access the content of another tenant, the partner user must be a member of a security group that is referenced by a FPO contained in the tenant organizational unit (see FIG. 5 as an example). A requesting user will be denied access if not a member of the security group. In one embodiment, when generating a claim for a given partner user, the provider daemon can use an object GUID of a FPO as a claim value rather than the GUID of the object being referred to in a foreign organizational unit as part of an access control operation.

In certain embodiments, a customer or directory service forest can be used to represent a portion of an online service or grid topology and configured to consist of one single-domain directory service forest having multiple directory service instances and associated domain controllers, including synchronization and provisioning daemons. In one embodiment, each online tenant occupies one customer forest. It will be appreciated that each grid network can include different directory service instances as part of providing online services and resources to subscribing customers associated with the customer forests. In one embodiment, components of the environment 400 operate to partition tenants or organizational units in units of scale as online directory service forests. Each directory service forest can be contained in a single service instance that contains a subset of tenants assigned to that service instance.

As described above, component of the environment 400 can be configured to control and manage access to online services and/or resources for various types of users and/or levels of association. For example, a customer can subscribe to online services that include the use of default partners to provide support services to subscribing customers of a default service(s), such as a partner company that performs administrative actions on behalf of an online service customer. Partners can also be online service customers.

An exemplary online support service can include one online service customer receiving support from a partner. A corresponding partner organizational unit can be used to contain all objects for the partner company. Likewise, a customer organizational unit contains all objects for the customer company including objects referring to the partner organizational unit. Exemplary online support services include various administrator services and support roles. For example, help desk administrators can be defined as a security group that contains principals granted only limited access to resources, and the scope of allowed actions for the group can differ across systems (e.g., only can read data, reset passwords and manage support tickets). Tenant administrators can be defined as a security group that contains principals granted all and every administrative right in the online application services.

An exemplary help desk agent is an employee of a partner who is allowed to perform actions on behalf of a partner's customers to the extent allowed according to an associated help desk administrators group defined in a corresponding customer organizational unit. An exemplary administrator agent is an employee of a partner who is allowed to perform actions on behalf of partner's customers to the extent allowed according to an associated tenant administrators group defined in a customer organizational unit. As described above, one or more FPOs can be contained in a customer organizational unit to represent one or more security principals (groups and/or users).

Figure 5:
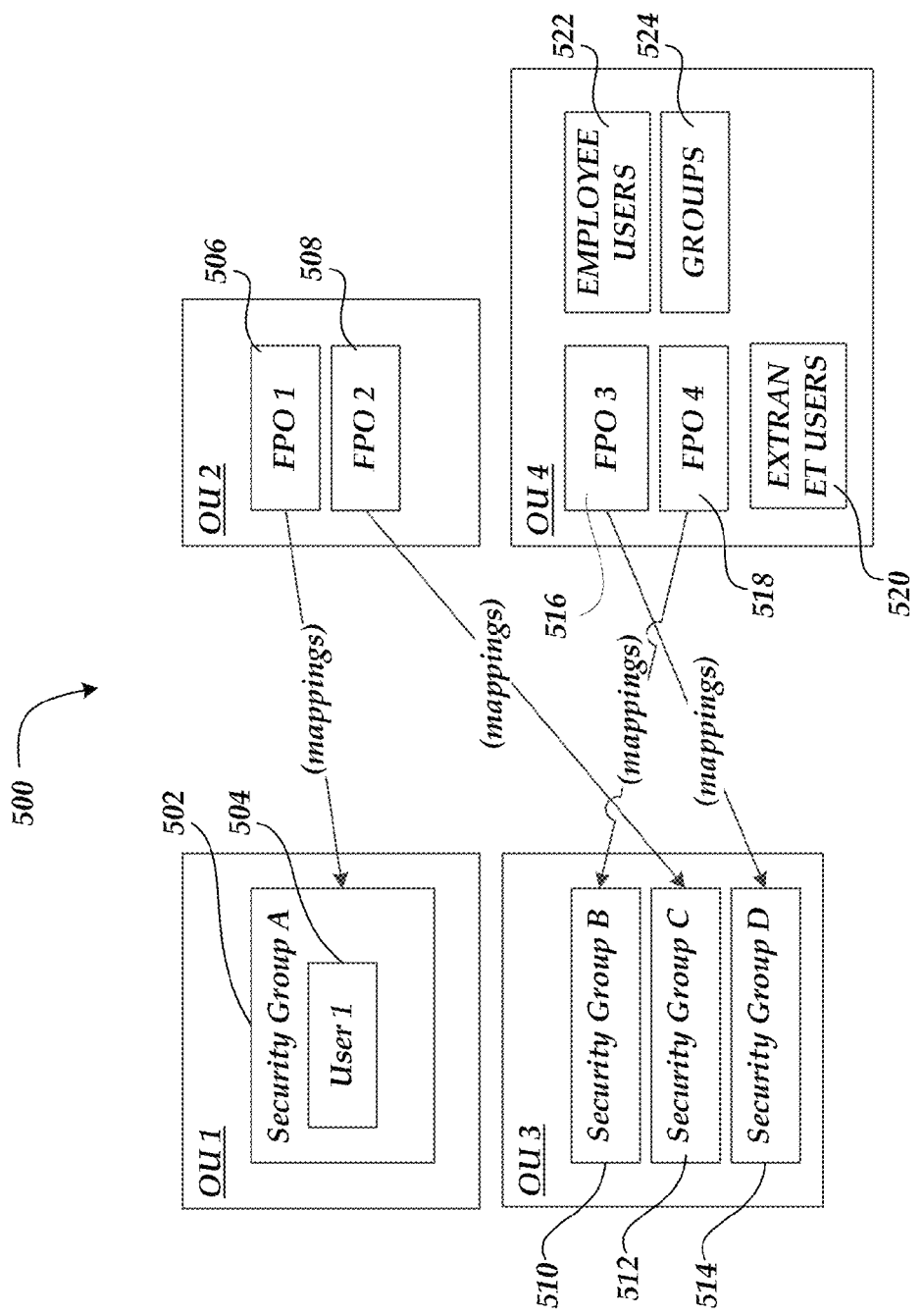
FIG. 5 is a block diagram depicting a number of exemplary organizational units of an online service application environment.

FIG. 5 is a block diagram depicting a number of exemplary organizational units (OU1-OU4) of an online application service environment 500. In an embodiment, one or more of the organizational units can be contained in one or more directory service instances, as described above. For example, a first directory service instance can be used to contain OU1 of Company A and OU3 of Company B, and a second directory service instance can be used to contain OU2 of Company C, and OU4 of Company D. In one embodiment, each directory service can be hosted by a dedicated server farm or component.

As shown in FIG. 5, OU1 includes a security group object 502 that contains one user object 504 for security group A. OU2 includes FPO1 506 and FPO2 508. As described above, a FPO can be used to reference a group or user that provides support services for some aspect of an online application service, but is not so limited. OU3 includes security group objects 510, 512, and 514 representing security group B, security group C, and security group D, respectively. OU4 includes FPO3 516, FPO4 518, object 520 containing extra-net user information, object 522 containing employee user information, and object 524 containing group information for the particular customer.

As shown, FPO1 506 includes a mapping that points to security group object 502 of OU1, and FPO2 508 includes a mapping that points to security group object 512 of OU3. FPO3 516 includes a mapping that points to security group object 514 and FPO4 518 includes a mapping that points to security group object 510 of OU3. As discussed above, the mappings can be between particular objects of corresponding OUs which can be used to verify that a particular user and/or group has permission to access particular assets of some online customer. For example, User 1 502 from OU1 will obtain any permission granted to FPO1 506 inside OU2 because User 1 502 is a member of Security Group A 504 that FPO1 506 maps to. It will be appreciated that each OU can include distinct access management information corresponding to a particular customer or entity access permissions.

While certain embodiments are described herein, other embodiments are available, and the described embodiments should not be used to limit the claims. Exemplary communication environments for the various embodiments can include the use of secure networks, unsecure networks, hybrid networks, and/or some other network or combination of networks. By way of example, and not limitation, the environment can include wired media such as a wired network or direct-wired connection, and/or wireless media such as acoustic, radio frequency (RF), infrared, and/or other wired and/or wireless media and components. In addition to computing systems, devices, etc., various embodiments can be implemented as a computer process (e.g., a method), an article of manufacture, such as a computer program product or computer readable media, computer readable storage medium, and/or as part of various communication architectures.

The term computer readable media as used herein may include computer storage media. Computer storage media may include volatile and nonvolatile, removable and non-removable media implemented in any method or technology for storage of information, such as computer readable instructions, data structures, program modules, or other data. System memory, removable storage, and non-removable storage are all computer storage media examples (i.e., memory storage). Computer storage media may include, but is not limited to, RAM, ROM, electrically erasable read-only memory (EE-PROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by a computing device. Any such computer storage media may be part of device.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, RF, infrared, and other wireless media.

The embodiments and examples described herein are not intended to be limiting and other embodiments are available. Moreover, the components described above can be implemented as part of networked, distributed, and/or other computer-implemented environment. The components can communicate via a wired, wireless, and/or a combination of communication networks. Network components and/or couplings between components of can include any of a type, number, and/or combination of networks and the corresponding network components include, but are not limited to, wide area networks (WANs), local area networks (LANs), metropolitan area networks (MANs), proprietary networks, back-end networks, etc.

Client computing devices/systems and servers can be any type and/or combination of processor-based devices or systems. Additionally, server functionality can include many components and include other servers. Components of the computing environments described in the singular tense may include multiple instances of such components. While certain embodiments include software implementations, they are not so limited and encompass hardware, or mixed hardware/software solutions. Other embodiments and configurations are available.

Exemplary Operating Environment

Figure 6:
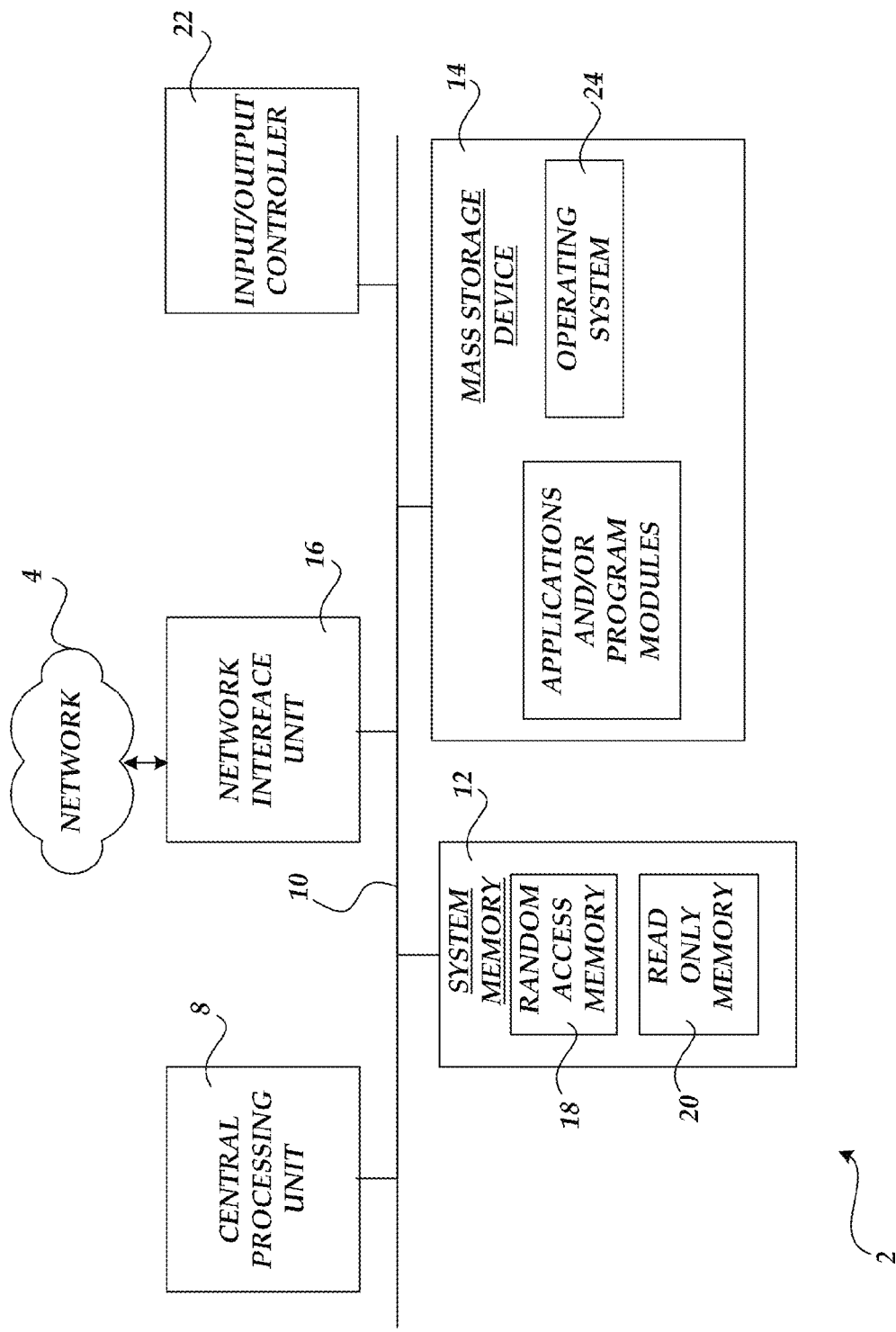
FIG. 6 is a block diagram illustrating an exemplary computing environment for implementation of various embodiments described herein.

Referring now to FIG. 6, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 6, an illustrative operating environment for embodiments of the invention will be described. As shown in FIG. 6, computer 2 comprises a general purpose desktop, laptop, handheld, or other type of computer capable of executing one or more application programs. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20. The computer 2 further includes a mass storage device 14 for storing an operating system 24, application programs, and other program modules.

The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 4, such as a local network, the Internet, etc. for example. The computer 2 may connect to the network 4 through a network interface unit 16 connected to the bus 10. It should be appreciated that the network interface unit 16 may also be utilized to connect to other types of networks and remote computing systems. The computer 2 may also include an input/output controller 22 for receiving and processing input from a number of other devices, including a keyboard, mouse, etc. (not shown). Similarly, an input/output controller 22 may provide output to a display screen, a printer, or other type of output device.

As mentioned briefly above, a number of program modules and data files may be stored in the mass storage device 14 and RAM 18 of the computer 2, including an operating system 24 suitable for controlling the operation of a networked personal computer, such as the WINDOWS operating systems from MICROSOFT CORPORATION of Redmond, Wash. The mass storage device 14 and RAM 18 may also store one or more program modules. In particular, the mass storage device 14 and the RAM 18 may store application programs, such as word processing, spreadsheet, drawing, e-mail, and other applications and/or program modules, etc.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method comprising:
    using a grid network architecture that includes a plurality of serving computers including using a grid manager to maintain global mappings associated with tenants and a plurality of directory service instances, wherein the grid manager operates in part to monitor a deployment status of the plurality of directory service instances and make one or more new directory service instances available to the tenants when called, wherein the grid manager provides global mapping information for synchronizing directory service instance updates;
    using the plurality of directory service instances in part to define access privileges for groups of customers requesting services of the serving computers, each directory service instance being independent of other directory service instances and including one or more organizational units, wherein each organizational unit is associated with a distinct customer and includes authorized users and one or more authorized foreign principle objects (FPOs);
    populating each organizational unit with customer data used to control access to services of the serving computers; and
    storing the directory service instances in computer readable storage.

2. The method of claim 1, further comprising receiving access requests for access to a datacenter including using domain information of each request to identify an organizational unit of a directory service instance corresponding to a user issuing the request wherein each FPO includes mapping parameters that point to another user object, group, or directory service instance of a different organizational unit.

3. The method of claim 1, further comprising using the directory service instances in conjunction with a domain that includes online resources and service accounts corresponding to dedicated service farms.

4. The method of claim 1, further comprising creating organizational units for each directory service instance, each organizational unit to include the authorized users, one or more authorized groups, and the one or more authorized FPOs, wherein the one or more authorized FPOs include one or more non-employee users with a reference to one of a partner tenant and a support agent role.

5. The method of claim 4, further comprising creating organizational units of each data instance to include mappings between FPOs and organizational units.

6. The method of claim 5, further comprising examining a FPO of a first organizational unit as part of locating a second organizational unit to verify support access.

7. The method of claim 1, further comprising denying access to a requested service if a requesting user is not associated with an organizational unit.

8. The method of claim 1, further comprising providing access to the requested services if a requesting user is associated with an organizational unit and included in a security group having defined access permissions.

9. The method of claim 1, further comprising using a plurality of user classes as part of populating each organizational unit.

10. The method of claim 1, further comprising updating directory service instances to maintain current access permissions within corresponding organizational units.

11. The method of claim 1, further comprising adding additional directory service instances to support additional customers.

12. The method of claim 1, further comprising providing real-time inventory of customer information to facilitate user authorization and resource management by building service tokens for permitted users of a grid network architecture.

13. A system comprising:
    server resources including processing and memory components to support one or more server farms as part of providing an online application service;
    a synchronization component to synchronize online customer data with the online application service using a number of directory service instance (DSI) data structures that include customer and partner information, wherein each DSI data structure includes one or more organizational units, wherein each organizational unit is associated with a distinct customer and includes authorized users and one or more authorized FPOs;
    a grid manager to maintain global mappings associated with tenants and the number of DSI data structures, wherein the grid manager operates in part to monitor a deployment status of the number of DSI data structures and make one or more new DSI data structures available to the tenants when called, wherein the grid manager provides global mapping information for synchronizing DSI data structure updates;
    storage to store the DSI data structures; and
    a claim provider component to query a domain controller associated with a DSI data structure stored in the storage to control access to the server resources.

14. The system of claim 13, wherein each DSI data structure includes a number of organizational unit data structures including user objects, group objects, and subscription objects.

15. The system of claim 14, wherein each DSI data structure includes multiple customer organizational units, each unit including customer employees, security groups, and extranet users.

16. The system of claim 14, wherein the server resources are accessible as part of an online service and based in part on at least one access type.

17. A computer readable storage device which stores encoded instructions used in part to provide online services comprising:
    maintaining global mappings associated with tenants and a plurality of directory service instances;
    monitoring a deployment status of the plurality of directory service instances;
    making one or more new directory service instances available to the tenants when called and providing global mapping information for synchronizing directory service instance updates;
    receiving a request for an online resource of a data grid network;
    obtaining access information from the request;
    identifying a directory service instance associated with the access information, wherein each directory service instance includes one or more organizational units, wherein each organizational unit is associated with a distinct customer and includes authorized users and one or more authorized FPOs; and examining the directory service instance to determine if the request issued from an authorized user and an access level of the authorized user.

18. The computer readable storage device of claim 17 which stores encoded instructions to control access based in part on an associated permission of an existing user of an augmented security group.

19. The computer readable storage device of claim 17 which stores encoded instructions to control access to an online asset based in part on a subscription and user type.

20. The computer readable storage device of claim 17 which stores encoded instructions that provide online services including building a service collection token using in part the access information augmented with any group claims.

* * * * *